(12) United States Patent
Ogawa et al.

(10) Patent No.: US 11,106,478 B2
(45) Date of Patent: Aug. 31, 2021

(54) SIMULATION DEVICE, SIMULATION METHOD, AND COMPUTER READABLE MEDIUM

(71) Applicant: Mitsubishi Electric Corporation, Tokyo (JP)

(72) Inventors: Daisuke Ogawa, Tokyo (JP); Masakatsu Toyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/648,007

(22) PCT Filed: Nov. 10, 2017

(86) PCT No.: PCT/JP2017/040605
§ 371 (c)(1),
(2) Date: Mar. 17, 2020

(87) PCT Pub. No.: WO2019/092849
PCT Pub. Date: May 16, 2019

(65) Prior Publication Data
US 2020/0257545 A1 Aug. 13, 2020

(51) Int. Cl.
*G06F 9/44* (2018.01)
*G06F 9/455* (2018.01)
*G06F 9/38* (2018.01)
*G06F 11/30* (2006.01)

(52) U.S. Cl.
CPC ............ *G06F 9/455* (2013.01); *G06F 9/3802* (2013.01); *G06F 11/302* (2013.01); *G06F 11/3055* (2013.01)

(58) Field of Classification Search
CPC .................................................. G06F 9/455
(Continued)

(56) References Cited

U.S. PATENT DOCUMENTS 6,067,604 A 5/2000 Ramachandran et al.
8,560,985 B1 * 10/2013 Sahu .................. G06F 30/33
716/106
(Continued)

FOREIGN PATENT DOCUMENTS

DE 10 2006 059 829 A1 6/2008
JP 2-118848 A 5/1990
(Continued)

OTHER PUBLICATIONS

International Search Report, issued in PCT/JP2017/040605, PCT/ISA/210, dated Dec. 12, 2017.
(Continued)

*Primary Examiner* — Timothy A Mudrick
(74) *Attorney, Agent, or Firm* — Birch, Stewart, Kolasch & Birch, LLP (57) ABSTRACT

In a simulation device (100), a calculation section (113) calculates an execution processing time required for executing each instruction code (221) of a plurality of instruction codes. A storage section (140) stores change setting information (230) in which a change rule that changes execution processing times of the plurality of instruction codes included in the processing unit is set. A change section (115) changes the execution processing time into a changed processing time according to the change rule being set in the change setting information (230). The change section (115) also includes the changed processing time of each instruction code of the plurality of instruction codes, in an entire time point (240). A simulation execution section (116) executes a simulation of a target program (210) using the entire time point (240). A monitoring section (120) monitors a status of a target model during execution of the simulation.

9 Claims, 8 Drawing Sheets

(58) Field of Classification Search
   USPC .......................................................... 703/22
   See application file for complete search history.

(56) References Cited

U.S. PATENT DOCUMENTS

| | | | |
|---|---|---|---|
| 2009/0172643 A1 | 7/2009 | Maruchi et al. | |
| 2010/0198799 A1* | 8/2010 | Krishnan | G06F 11/3696 |
| | | | 707/702 |
| 2014/0214374 A1* | 7/2014 | Haas | G06F 30/20 |
| | | | 703/2 |
| 2018/0032640 A1 | 2/2018 | Yabuki | |

FOREIGN PATENT DOCUMENTS

| | | |
|---|---|---|
| JP | 10-161906 A | 6/1998 |
| JP | 10-221410 A | 8/1998 |
| JP | 11-149555 A | 6/1999 |
| JP | 11-232136 A | 8/1999 |
| JP | 2000-267889 A | 9/2000 |
| JP | 2001-282327 A | 10/2001 |
| JP | 2007-11720 A | 1/2007 |
| JP | 2008-262318 A | 10/2008 |
| JP | 2009-157456 A | 7/2009 |
| JP | 2010-128722 A | 6/2010 |
| JP | 2010-244183 A | 10/2010 |
| JP | 2011-238137 A | 11/2011 |
| JP | 2017-84082 A | 5/2017 |
| WO | WO 2016/143337 A1 | 9/2016 |

OTHER PUBLICATIONS

German Office Action dated Aug. 6, 2020 for Application No. 11 2017 008 061.4 with an English translation.

* cited by examiner

230 : CHANGE SETTING INFORMATION

| PROCESSING UNIT NAME 231 | START ADDRESS 232 | END ADDRESS 233 | SIZE 234 | CHANGE RULE 235 |
|---|---|---|---|---|
| funcA | 0xXXX | 0xYYY | 0xZZ | +30% |
| funcB | 0xAAA | 0xBBB | 0xPP | −10% |
| ... | ... | ... | ... | ... |

Fig. 5

250: MONITORING TARGET INFORMATION

| MONITORING TARGET MODEL | STATUS INFORMATION | EXPECTATION VALUE |
|---|---|---|
| TIMER | PIN 0 (EXTERNAL PIN) | EQUAL TO VALUE AT PREVIOUS TIME POINT |
| TIMER | COUNTER 0 (INTERNAL REGISTER) | LARGER THAN VALUE AT PREVIOUS TIME POINT |
| ... | ... | ... |

SIMULATION DEVICE, SIMULATION METHOD, AND COMPUTER READABLE MEDIUM

TECHNICAL FIELD

The present invention relates to a simulation device, a simulation method, and a simulation program.

BACKGROUND ART

A simulator is available according to which a simulation is performed with building a target model including a target central processing unit (CPU), being a simulation target, in a host computer. This simulator is provided with a test scenario which includes time information, a scenario analysis section which analyzes the test scenario, and a scenario execution section which executes the scenario. Based on an analysis result and at a time described in the scenario, the scenario execution section drives a signal described in the scenario. With this configuration, the simulator can perform a system test even in the absence of an actual machine or a hardware simulator.

Patent Literature 1 discloses a method which performs behavior verification of software through a simulation that is performed with linking a plurality of hardware models. The method of Patent Literature 1 shortens a time required for behavior verification of the software by accelerating a time lapse in the hardware models.

CITATION LIST

Patent Literature

Patent Literature 1: JP 2000-267889 A

SUMMARY OF INVENTION

Technical Problem

The technique of Patent Literature 1 cannot perform behavior verification by means of a timing difference such as a CPU load fluctuation and waiting for hardware, that is, by means of timing robustness.

It is an objective of the present invention to enable behavior verification by means of timing robustness, thereby improving a verification quality.

Solution to Problem

A simulation device according to the present invention, which performs a simulation of executing a target program in a target model built in a virtual environment, the target program including a processing unit consisting of a plurality of instruction codes, includes:

a calculation section to calculate an execution processing time required for executing each instruction code of the plurality of instruction codes;

a storage section to store change setting information in which the processing unit and a change rule that changes execution processing times of the plurality of instruction codes included in the processing unit are set;

a change section to change the execution processing time into a changed processing time according to the change rule being set in the change setting information, and to include the changed processing time of each instruction code of the plurality of instruction codes, in an entire time point indicating time point setting of the simulation;

a simulation execution section to execute the simulation of the target program using the entire time point; and a monitoring section to monitor a status of the target model during execution of the simulation.

Advantageous Effects of Invention

In a simulation device according to the present invention, a change section changes an execution processing time into a changed processing time according to a change rule. Then, the change section includes the changed processing time of each instruction code of a plurality of instruction codes, in an entire time point of a simulation. Also, a simulation execution section executes a simulation of a target program using the entire time point. Then, a monitoring section monitors a status of a target model during execution of the simulation. Hence, with the simulation device according to the present invention, a timing difference in execution of an instruction code is generated by a simple configuration, and behavior verification by means of timing robustness is enabled, thereby improving a verification quality.

DESCRIPTION OF EMBODIMENTS

An embodiment of the present invention will be described below with referring to drawings. In the drawings, the same or equivalent portions are denoted by the same reference numerals. In description of embodiment, a description of the same or equivalent portions will be appropriately omitted or simplified.

Embodiment 1

Description of Configuration

A configuration of a simulation device 100 according to this embodiment will be described with referring to FIG. 1.

The simulation device 100 is a computer. The simulation device 100 is provided with a processor 910 as well as other hardware devices such as a memory 921, an auxiliary storage device 922, an input interface 930, and an output interface 940. The processor 910 is connected to the other hardware devices via a signal line and controls these other hardware devices.

The simulation device 100 is provided with a CPU model 110, a monitoring section 120, a hardware (HW) model 130, and a storage section 140, as function elements. The CPU model 110 is provided with an instruction fetch section 111, an instruction execution section 112, a calculation section 113, a determination section 114, a change section 115, and a simulation execution section 116. The HW model 130 is provided with a memory model 131, an external 10 model 132, a peripheral device model 133, and a CPU bus model 134. Change setting information 230, an entire time point 240, and monitoring target information 250 are stored in the storage section 140.

The simulation device 100 takes a virtual model consisting of the CPU model 110 and the HW model 130, as a target model of a simulation. The target model consisting of the CPU model 110 and the HW model 130 is a virtual model built in a virtual environment of the simulation device 100.

Functions of the CPU model 110 and monitoring section 120 are implemented by software.

The storage section 140 is provided to the memory 921. A target program 210 to activate the target model is stored in the memory 921, besides the storage section 140. The memory 921 is provided with an instruction memory 220 that stores instruction codes 221 of the target program 210.

Figure 1:
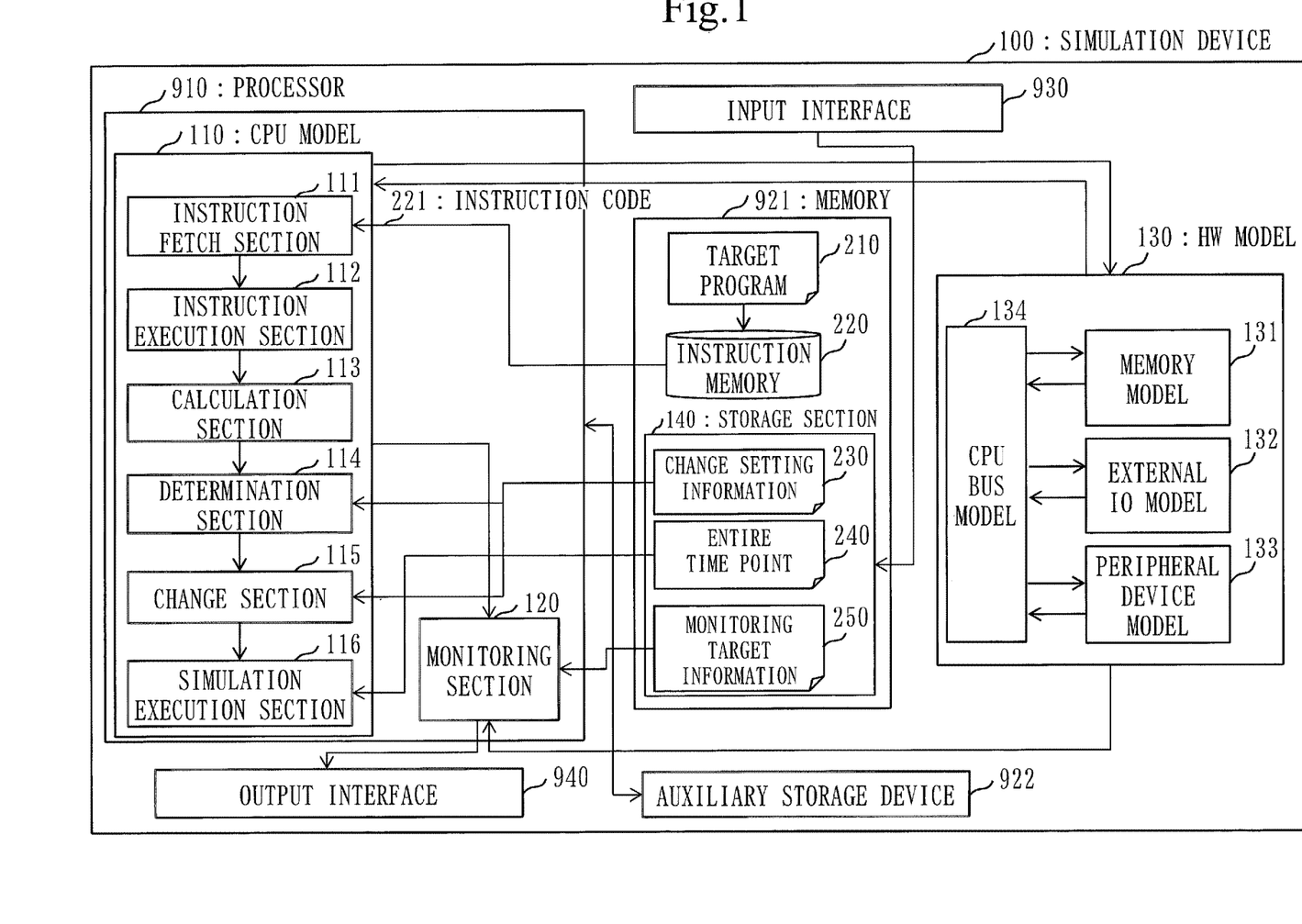
FIG. 1 is a configuration diagram of a simulation device 100 according to Embodiment 1.

Although the HW model 130 is placed outside the processor 910 in FIG. 1, the HW model 130 is built virtually by the processor 910 and the hardware devices.

The processor 910 is a device that executes a simulation program. The simulation program is a program that implements the functions of the CPU model 110 and monitoring section 120.

The processor 910 is an integrated circuit (IC) which performs arithmetic processing. Specific examples of the processor 910 include a CPU, a digital signal processor (DSP), and a graphics processing unit (GPU).

The memory 921 is a storage device which stores data temporarily. Specific examples of the memory 921 include a static random access memory (SRAM) and a dynamic random access memory (DRAM).

The auxiliary storage device 922 is a storage device which stores data. Specific examples of the auxiliary storage device 922 include an HDD. Alternatively, the auxiliary storage device 922 may be a portable storage medium such as an SD (registered trademark) memory card, a CF, a NAND flash, a flexible disk, an optical disk, a compact disk, a blu-ray (registered trademark) disk, and a DVD. HDD is an acronym of hard disk drive. SD (registered trademark) is an acronym of secure digital. CF is an acronym of compact flash. DVD is an acronym of digital versatile disk.

The input interface 930 is a port connected to an input device such as a mouse, a keyboard, and a touch panel. The input interface 930 is specifically a universal serial bus (USB) terminal. The input interface 930 may be a port connected to a local area network (LAN). The simulation device 100 acquires information such as the change setting information 230 and monitoring target information 250 via the input interface 930, and stores the acquired information in the storage section 140.

The output interface 940 is a port connected to a cable of an output apparatus such as a display. The output interface 940 is specifically a USB terminal or a high definition multimedia interface (HDMI; registered trademark) terminal. The display is specifically a liquid crystal display (LCD). The simulation device 100 displays information such as a monitoring result of the monitoring section 120 onto the display via the output interface 940.

The simulation program is read by the processor 910 and executed by the processor 910. Not only the simulation program but also an operating system (OS) is stored in the memory 921. The processor 910 executes the simulation program while executing the OS. The simulation program and the OS may be stored in the auxiliary storage device 922. The simulation program and the OS stored in the auxiliary storage device 922 are loaded to the memory 921 and executed y the processor 910. The simulation program may be incorporated in the OS partly or entirely.

The simulation device 100 may be provided with a plurality of processors that substitute the processor 910. The plurality of processors share execution of the simulation program. Each processor is a device that executes the simulation program as the processor 910 does.

Data, information, signal values, and variable values which are utilized, processed, or outputted by the simulation program are stored in the memory 921, the auxiliary storage device 922, or a register or cache memory in the processor 910.

The simulation program causes the computer to execute processes, procedures, or stages corresponding to individual sections in the CPU model 110 and the monitoring section 120 with their "section" being substituted by "process", "procedure", or "stage". The individual sections in the CPU model 110 and the monitoring section 120 are the instruction fetch section 111, the instruction execution section 112, the calculation section 113, the determination section 114, the change section 115, the simulation execution section 116, and the monitoring section 120. A simulation method is a method that is carried out by the simulation device 100 through execution of the simulation program.

The simulation program may be stored in a computer-readable recording medium and provided in the form of the medium. Alternatively, the simulation program may be provided in the form of a program product.

Description of Behavior

Simulation process S100 by the simulation device 100 according to this embodiment will be described with referring to FIG. 2. FIG. 3 is a diagram to explain simulation process S100 according to this embodiment. For the descriptive convenience of the behavior of simulation process S100, FIG. 3 lists examples of an address and the instruction code 221, which are processing targets, of the instruction memory 220, and examples of an execution processing time of the process and a changed processing time obtained after the change, by associating them with each other.

The simulation device 100 performs a simulation of executing the target program 210 in the target model built in the virtual environment, the target program 210 including a processing unit consisting of a plurality of instruction codes. The target program 210 includes a plurality of processing units. Each of the plurality of processing units consists of a plurality of instruction codes. The simulation device 100 performs the simulation based on the entire time point 240 indicating time point setting of the simulation.

In step S101, the instruction fetch section 111 fetches the instruction code 221 from the instruction memory 220. In the case of FIG. 3, the instruction fetch section 111 fetches ADR as the instruction code 221, from address 0x0005 of the instruction memory 220.

In step S102, the instruction execution section 112 executes the fetched instruction code 221. In the case of FIG. 3, the instruction execution section 112 executes ADR fetched from the instruction memory 220.

In step S103, the calculation section 113 calculates an execution processing time required for executing each instruction code of the plurality of instruction codes. Specifically, regarding the instruction code 221 executed in step S102, the calculation section 113 calculates an execution processing time required for executing the instruction code 221. In the case of FIG. 3, the calculation section 113 calculates the execution processing time of ADR and obtains 3 cycles.

In step S104, the determination section 114 determines whether the instruction code 221 fetched by the instruction fetch section 111 is included in the processing unit which is set in the change setting information 230. That is, the determination section 114 determines whether the instruction code 221 fetched by the instruction fetch section 111 is an instruction code included in the processing unit whose execution processing time is to be changed. A processing unit is a unit of processing such as a function and a task.

The change setting information 230 according to this embodiment will be described with referring to FIG. 4.

In the change setting information 230, a processing unit and a change rule that changes execution processing times of the plurality of instruction codes included in the processing unit are set. The target program 210 includes a plurality of processing units. Among the plurality of processing units, a processing unit whose execution processing time is to be changed is set in the change setting information 230. That is, the processing unit being set in the change setting information 230 is a processing unit whose execution processing time for an instruction code constituting the processing unit of the target program 210 is to be changed.

The change setting information 230 includes a name of the processing unit, a start address of the processing unit in the instruction memory 220, and an end address of the processing unit in the instruction memory 220. Specifically, a processing unit name 231, a start address 232, an end address 233, a size 234, and a change rule 235 are set in the change setting information 230. The processing unit name 231 is the name of the processing unit consisting of a plurality of instruction codes. The start address 232 is a start address of the processing unit in the instruction memory 220. The end address 233 is an end address of the processing unit in the instruction memory 220. The size 234 is a size of the processing unit. The change rule 235 is a changing method of changing the execution processing times of the instruction codes. The change rule 235 is specified by, for example, a positive/negative multiplier factor or a positive/negative fixed value. It suffices if at least either the end address 233 or the size 234 is set in the change setting information 230. That is, it suffices if information indicating where the processing unit ends is included. This information is not limited to an address or a size but may be any other information as far as it indicates where the processing unit ends.

Figure 4:
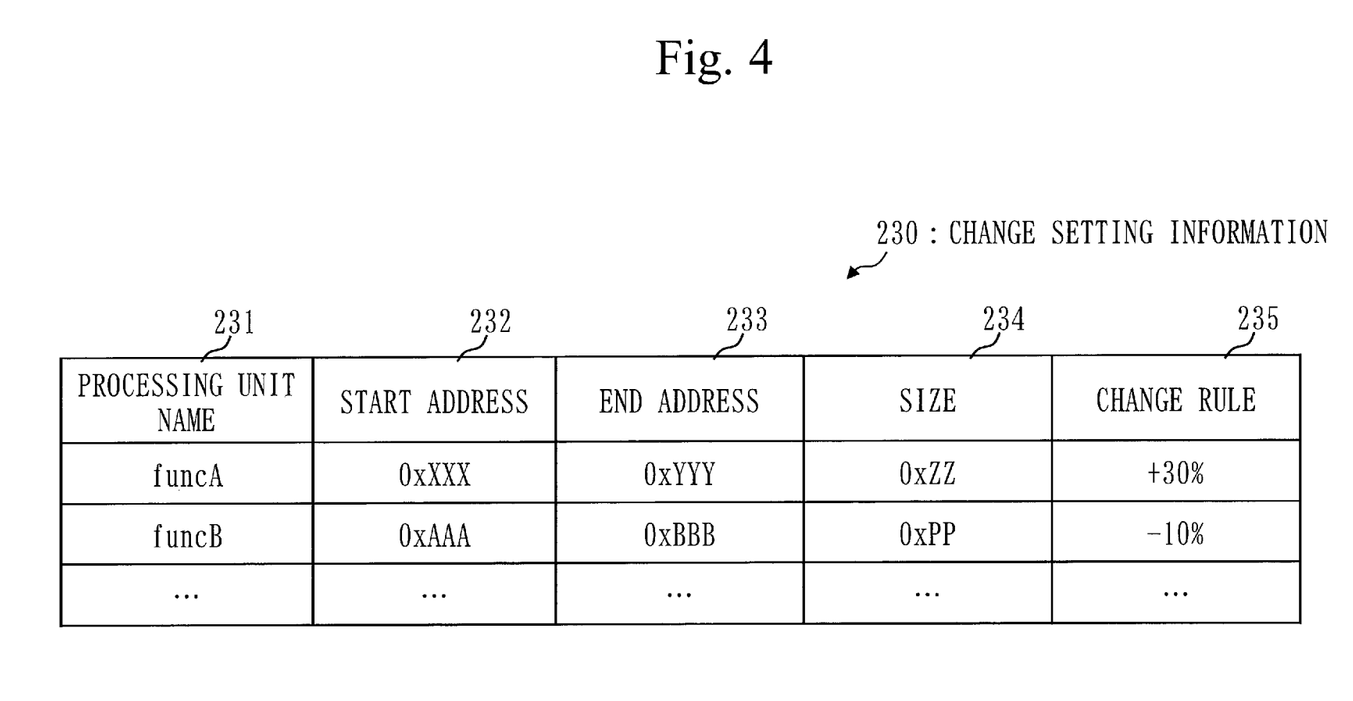
FIG. 4 is a diagram illustrating an example of change setting information 230 according to Embodiment 1.

In FIG. 4, for a processing unit funcA, a change rule 235 that changes the execution processing time by a prolongation of 30% is set. For a processing unit funcB, a change rule 235 that changes the execution processing time by a contraction of 10% is set.

When the address of the instruction code 221 in the instruction memory 220 is contained between the start address 232 and the end address 233, the determination section 114 determines that this instruction code 221 is included in the processing unit which is set in the change setting information 230. That is, the determination section 114 determines whether there is a processing unit including an address of an instruction code fetched from the instruction memory 220, among the processing units which are set in the change setting information 230. If there is a processing unit including the address of the instruction code, the process proceeds to step S105. If there is no processing unit including the address of the instruction code, the process proceeds to step S106.

Each of the start address 232 and the end address 233 may be either of a virtual address and a physical address. A virtual address handled in a processor and a physical address of a memory may be the same or different. If different, a process of converting a virtual address into a physical address is performed. This embodiment can cope with such a process as well.

Figure 2:
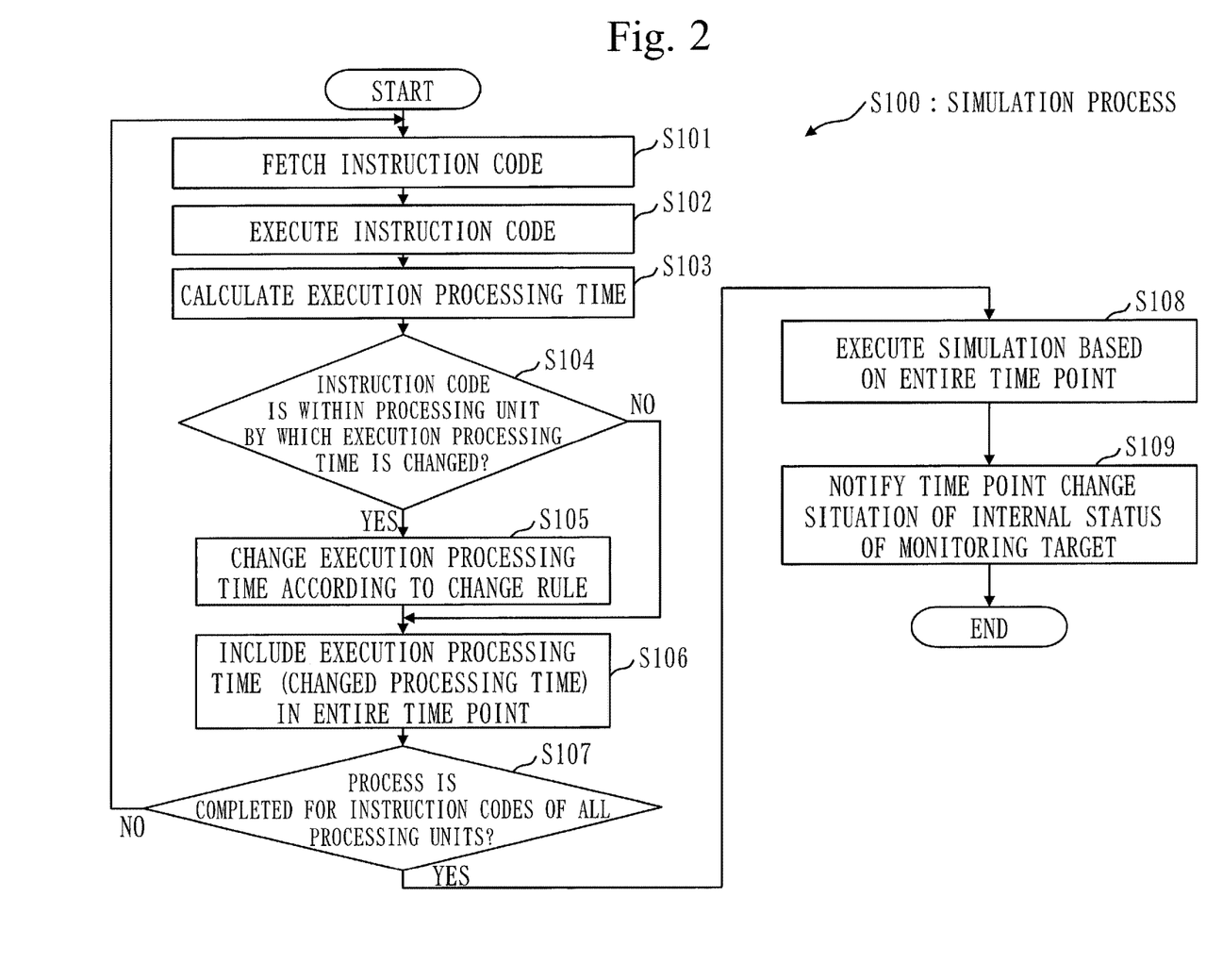
FIG. 2 is a flowchart of simulation process S100 by the simulation device 100 according to Embodiment 1.
Figure 3:
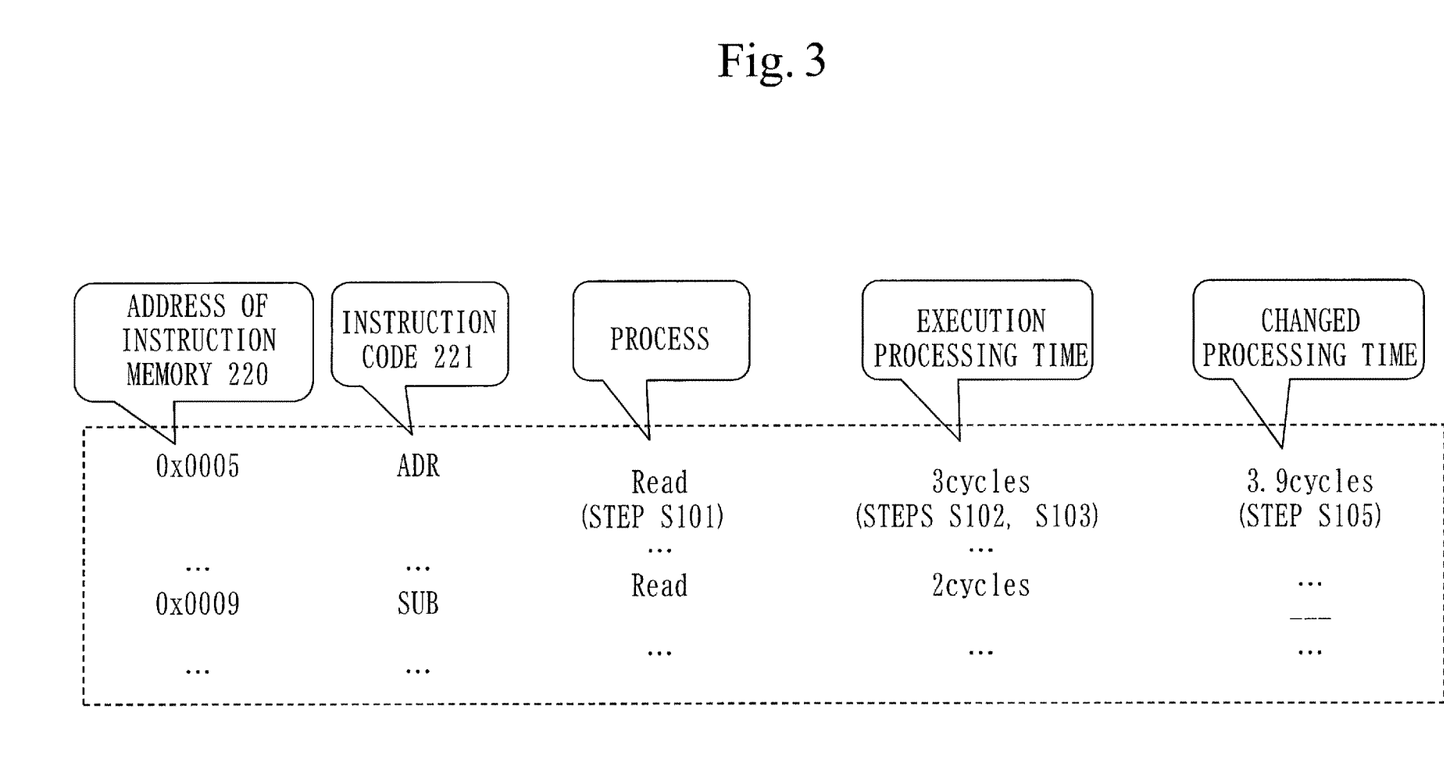
FIG. 3 is a diagram to explain simulation process S100 according to Embodiment 1.

In FIG. 2, the determination section 114 determines whether an instruction code whose execution processing time has been calculated by the calculation section 113 is included in the processing unit of the change target. Alternatively, the determination section 114 may monitor execution of an instruction code in execution of the simulation and notify the change section 115 that an instruction in execution is an instruction code to change the execution processing time.

In step S105, the change section 115 changes the execution processing time into a changed processing time according to the change rule being set in the change setting information 230. Specifically, when address 0x0005 of an instruction code ADR of FIG. 3 is contained between address OxXXX and address OxYYY of funcA of FIG. 4, ADR is an instruction code to change the execution processing time. The change rule is "+30%". Hence, the change section 115 changes the execution processing time of 3 cycles of ADR to 3.9 cycles with an increment of 30%. The 3.9 cycles after the change is also called a changed processing time.

In step S106, the change section 115 includes the changed processing time of each instruction code of the plurality of instruction codes, in the entire time point 240 indicating time point setting of the entire simulation. Specifically, the change section 115 includes the execution processing time of the instruction code, in the entire time point 240 stored in the storage section 140. If the instruction code is included in the processing unit whose execution processing time is to be changed, the time to be included in the entire time point 240 is an after-change execution processing time that has been changed in step S105, that is, the changed processing time. If the instruction code is not included in the processing time whose execution processing time is to be changed, the time to be included in the entire time point 240 is the execution processing time calculated in step S103.

In step S107, the change section 115 determines whether the process is completed for all the instruction codes of all the processing units included in the target program 210 that executes the simulation. If the process is completed for all the processing units, the process proceeds to step S108. If there is a processing unit for which the process is not completed yet, the process returns to step S101.

In step S108, the simulation execution section 116 executes the simulation using the entire time point 240. Specifically, based on the entire time point 240, the simulation execution section 116 executes the target program 210 using the CPU model 110, to perform simulation of the HW model 130.

In step S109, the monitoring section 120 monitors a status of the target model during execution of the simulation. The monitoring target information 250, in which a monitoring target model being a monitoring target in the target model, status information indicating a status of the monitoring target model, and an expectation value of the status information are set, is stored in the storage section 140. The monitoring section 120 monitors a time point change situation of the status information of the monitoring target model based on the monitoring target information 250, and outputs a monitoring result. Specifically, the monitoring section 120 monitors an arbitrary internal status of an arbitrary model in the simulation device 100. The monitoring section 120 notifies a time point change situation of the status information of the monitoring target model being set in the monitoring target information 250 to the outside by, for example, displaying the time point change situation onto the display.

Figure 5:
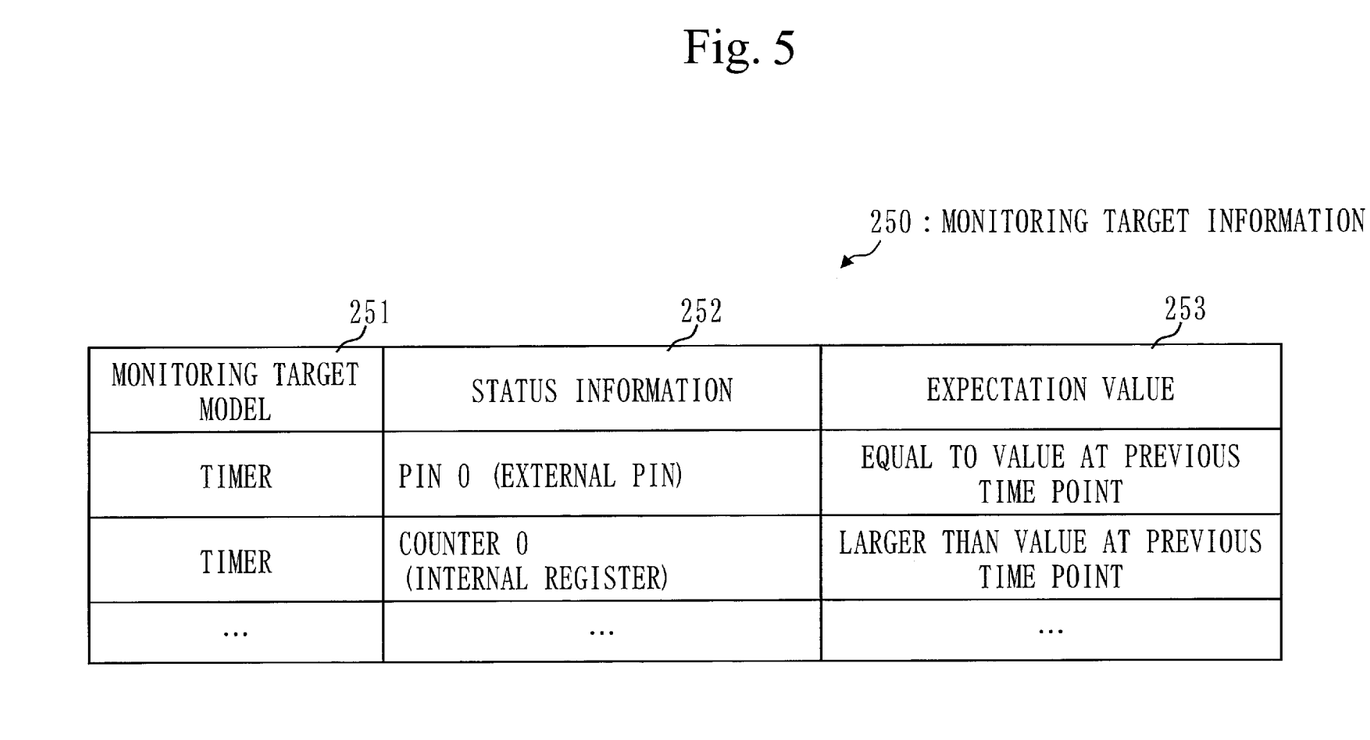
FIG. 5 is a diagram illustrating an example of monitoring target information 250 according to Embodiment 1.

The monitoring target information 250 according to this embodiment will be described with referring to FIG. 5.

Out of the target model consisting of the CPU model and the HW model 130, a monitoring target model 251 as a target to be monitored by the monitoring section 120 is set in the monitoring target information 250. In FIG. 5, a timer is listed as an example of the monitoring target model 251. Also, status information 252 indicating a status of the monitoring target model 251 is set in the monitoring target information 250. As the status information 252 of the monitoring target model 251, information such as an internal variable name of the software, a register name, a signal name, and an address is set in the monitoring target information 250. Also, an expectation value 253 of the status information 252 is set in the monitoring target information 250. The expectation value 253 is also called a monitoring condition. Information such as being equal to a value at a previous time point, larger than a value at a previous time point, larger than a value at the previous time point by a certain value, smaller than a value at a previous time point, and smaller than a value at a previous time point by a certain value, is set as the expectation value 253.

During execution of the simulation, the monitoring section 120 monitors a time point change situation of a target signal or target variable of a model being a monitoring target, regarding the CPU model and the HW model 130. The monitoring section 120 notifies a monitoring result to the outside. For example, when the target signal or the target variable takes a value other than an expectation value, the monitoring section 120 may notify alarm information indicating occurrence of malfunction to the outside.

Other specific examples of the monitoring target model 251 will be described below.

A specific example of the monitoring target model 251 is a memory. Other specific examples are a peripheral device model such as a direct memory access (DMA), an interrupt controller, a motor, an FPGA, and an ASIC. Note that FOGA is an acronym of field-programmable gate array and ASIC is an acronym of application specific integrated circuit. Still another specific example is an external JO model such as a universal asynchronous receiver/transmitter (UART) and PCIe. The CPU model is also one example of the monitoring target model 251.

Inside the memory, data stored at a specific address, or an input/output pin (an address pin, a chip select pin, a write enable pin, or the like) of the memory is monitored. A variable of the target program is basically stored in the memory and monitored with specifying an address.

In the DMA or interrupt controller, a register which stores setting and status, an interrupt pin, or the like is monitored.

In the motor, mainly a pin is monitored. A status such as whether an output pin of the motor outputs an anticipated value is monitored.

In the FPGA or ASIC, an internal register, an input/output pin, or the like is monitored, as in the DMA.

In the UART or PCIe, an internal register or the like is monitored, as in the DMA. Communication data is inevitably stored in a reception register or transmission register, and accordingly the communication data in the reception register or transmission register is monitored. A status such as being received or error is also stored in the register, and accordingly such status is monitored. In the UART or PCIe, an external pin is also monitored as in the DMA or the like.

In the CPU model, an internal register characteristic to the CPU is monitored. Specifically, information such as a value of a program counter (PC), a value of a status register, and a value of a versatile register is monitored.

Figure 6:
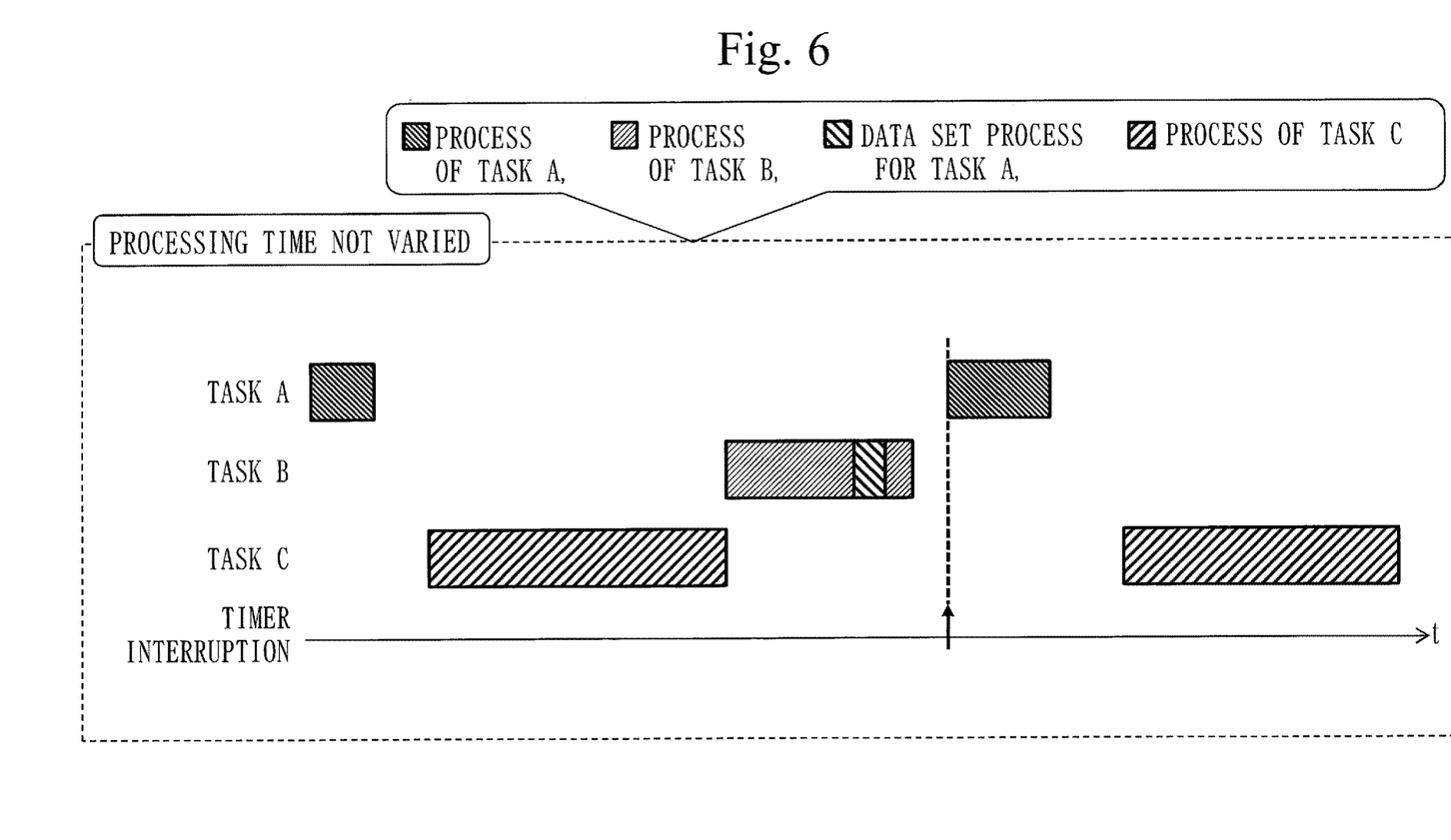
FIG. 6 is a schematic diagram of a case where a simulation is performed without changing an execution processing time in Embodiment 1.
Figure 7:
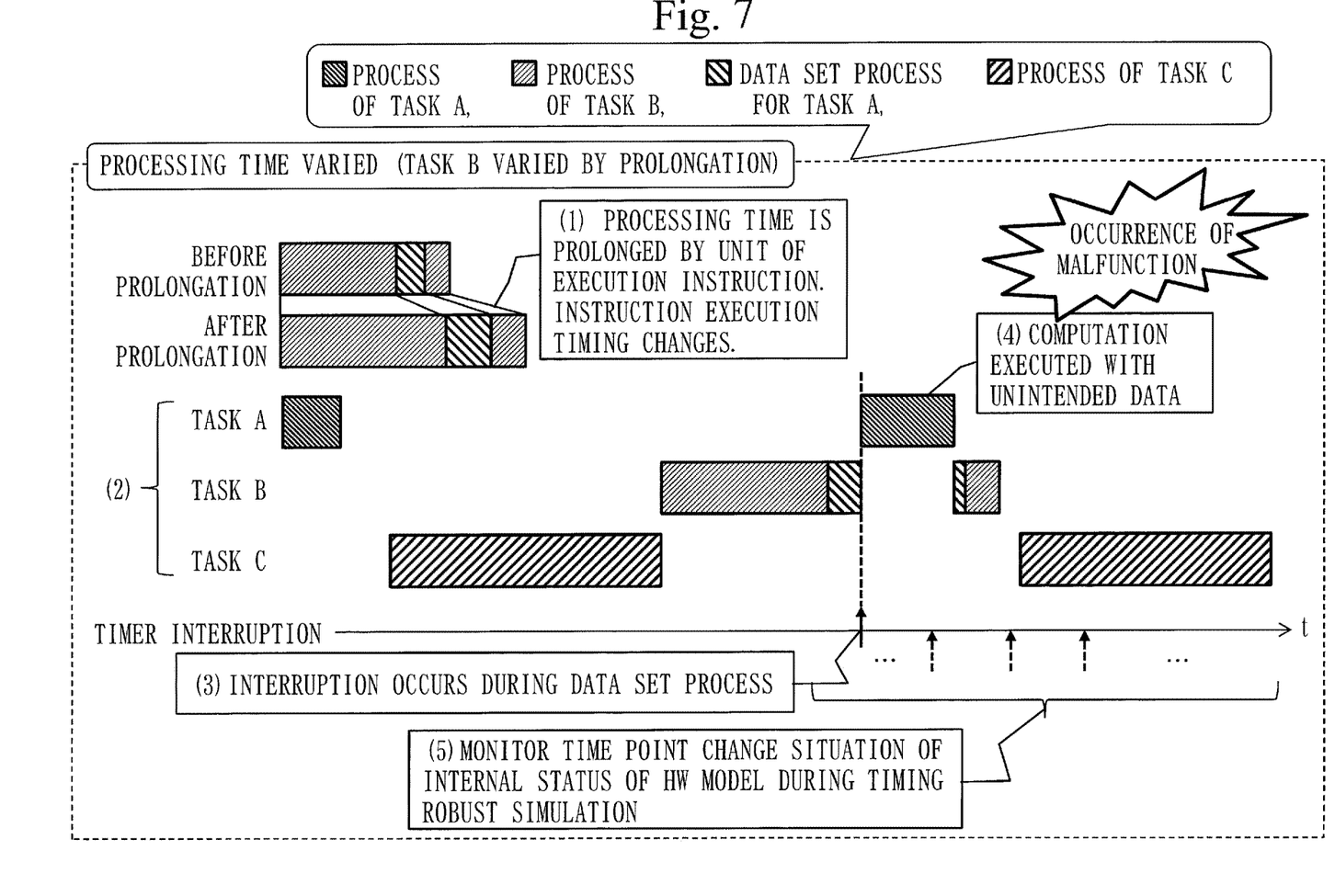
FIG. 7 is a schematic diagram of a case wherein a simulation is performed with changing the execution processing time in Embodiment 1.

FIG. 6 is a schematic diagram of a case where a simulation is performed without changing the execution processing time. FIG. 7 is a schematic diagram of a case where a simulation is performed with changing the execution processing time.

A simulation process according to this embodiment will further be described with referring to FIGS. 6 and 7.

In FIG. 6, the process is executed in the order of a task A, a task C, and a task B. A data set process for the task A is performed halfway through the task B. After the process of the task B is completed, the task A is activated by timer interruption. That is, the task A and the task B are synchronized.

FIG. 7 illustrates how timing robustness is introduced into the simulation of FIG. 6 to perform timing robust verification.

(1) In FIG. 7, assume that the preset rule for the task B is prolonging the execution processing time by 30%. By the process from step S101 to step S107 described above, the execution process time of each instruction code of the task B is prolonged by 30%. Hence, the execution timing of each instruction code of the task B is changed.

(2) The process is executed in the order of the task A, the task C, and the task B as in FIG. 6.

(3) The execution processing time of each instruction code of the task B is prolonged such that timer interruption occurs during the data set process for the task A. Hence, timer interruption occurs during the data set process for the task A.

(4) The task A is activated by timer interruption. However, as the data set process for the task A is not yet completed, computation of the task A is executed with using unintended data, leading to an occurrence of malfunction.

(5) During execution of the simulation, the monitoring section 120 monitors the status information of a monitoring target model being set in the monitoring target information 250, and notifies a monitoring result to an outside. In this manner, in the simulation process of FIG. 7, timing robust verification can be performed easily by introducing timing robustness, so that the verification performance of the simulation device 100 can be improved.

Other Configurations

Modification 1

A simulation device 100 may be provided with a communication apparatus which communicates with other devices via a network. The communication apparatus has a receiver and a transmitter. The communication apparatus is connected to a communication network such as a LAN, the Internet, and a telephone line by wired connection or wireless connection. The communication apparatus is specifically a communication chip or a network interface card (NIC). The simulation device 100 may receive change setting information 230 or monitoring target information 250 from an external device via the communication apparatus and store the received information in a storage section 140. Alternatively, the simulation device 100 may transmit a monitoring result obtained by a monitoring section 120 to an external device.

Modification 2

In Embodiment 1, the name of the processing unit, and the start address and end address of the processing unit are set in the change setting information. The determination section determines whether an instruction code is included in the processing unit using the address of the instruction code and the start address and end address of the processing unit.

As Modification 2, the name of the processing unit and a range of the change time point may be set in change setting information. In this case, when a time point to execute the instruction code fetched by the instruction fetch section is included in the range of the change time point of the change setting information, the determination section determines that the instruction code is included in the processing unit which is set in the change setting information. Then, a change section changes an execution processing time of the instruction code which has been determined as being included in the processing unit of a change target, according to a change rule. Except for this, the process is the same as that of Embodiment 1.

Modification 3

In Embodiment 1, the functions of the instruction fetch section 111, instruction execution section 112, processing time calculation section 113, determination section 114, processing time point change section 115, processing time simulation execution section 116, and monitoring section 120 are implemented by software. In the following, there is a case where functions of an instruction fetch section 111, instruction execution section 112, processing time calculation section 113, determination section 114, processing time point change section 115, simulation execution section 116, and monitoring section 120 are referred to as a function of a CPU model 110 and a function of the monitoring section 120. As a modification, the functions of the CPU model 110 and monitoring section 120 may be implemented by hardware.

Figure 8:
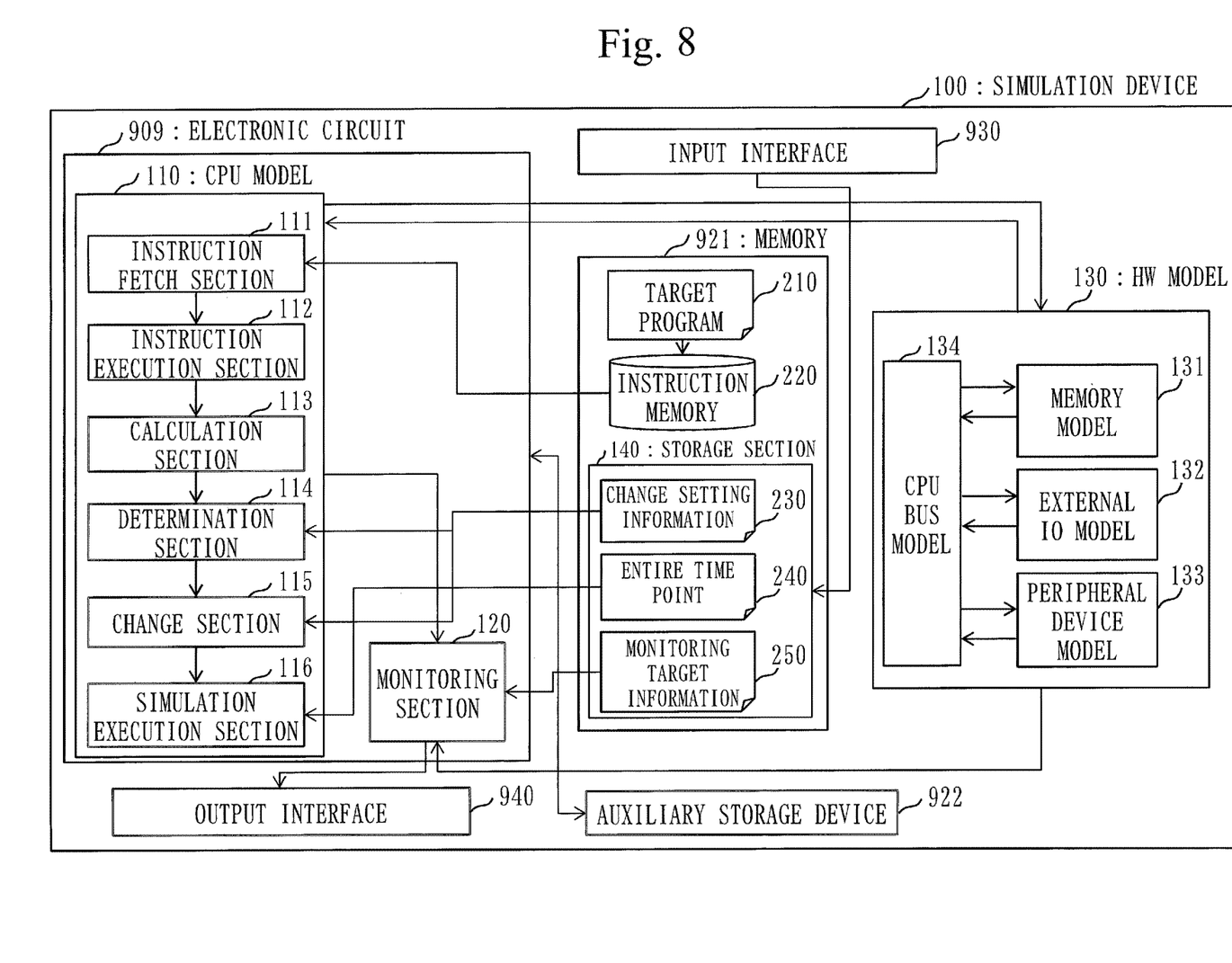
FIG. 8 is a configuration diagram of a simulation device 100 according to a modification of Embodiment 1.

FIG. 8 is a configuration diagram of a simulation device 100 according to a modification of Embodiment 1.

The simulation device 100 is provided with an electronic circuit 909, a memory 921, an auxiliary storage device 922, an input interface 930, and an output interface 940.

The electronic circuit 909 is a dedicated electronic circuit that implements the functions of the CPU model 110 and monitoring section 120.

The electronic circuit 909 is specifically a single circuit, a composite circuit, a programmed processor, a parallel-programmed processor, a logic IC, a GA, an ASIC, or an FPGA. Note that GA is an acronym of gate array.

The functions of the CPU model 110 and monitoring section 120 may be implemented by one electronic circuit or by a plurality of electronic circuits by distribution.

According to another modification, some of functions of a CPU model 110 and monitoring section 120 may be implemented by the electronic circuit and the remaining functions may be implemented by software.

The processor and the electronic circuit are called processing circuitry. That is, in the simulation device 100, the functions of the CPU model 110 and monitoring section 120 are implemented by the processing circuitry.

In the simulation device 100, "section" in each of the instruction fetch section, instruction execution section, processing time calculation section, determination section, processing time change section, simulation execution section, and monitoring section may be substituted by "stage" or "process". Also, "process" in each of the instruction fetch process, instruction execution process, processing time calculation process, determination process, processing time change process, simulation execution process, and monitoring process may be substituted by "program", "program product", or "computer-readable storing medium recorded with a program".

Description on Effect of Embodiment

In the simulation device 100 according to Embodiment 1, the change section changes the execution processing time of the change-target instruction code based on the change setting information. The change section then includes the execution processing time that has been changed, in the entire time point of the simulation. Hence, with the simulation device 100, a difference in execution timing of an instruction can be simulated. In the simulation device 100, the monitoring section monitors a time point change situation of the internal status of the target model that simulates the difference in execution timing of the instruction. Therefore, with the simulation device 100, timing robust verification is enabled, ensuring a test quality with consideration being paid to a disturbance element such as a CPU load fluctuation and waiting for hardware.

In the simulation device 100 according to this embodiment, an arbitrary processing unit of the target program of the simulation is specified, and the execution processing time is changed only for the specified processing unit. As the simulation device 100 employs the setting change information, it is possible to specify change of the execution processing time of the instruction by a processing unit such as a function or task of software. Also, in the simulation device 100, the simulation time point can be changed for each processing time unit according to an arbitrary change rule. That is, in the simulation device 100, a processing time of only part of the software can be changed according to an arbitrary change rule. In the simulation device 100, the entire target model being a simulation target behaves synchronically along the changed virtual time line. In this manner, the simulation device 100 enables simulation and verification of an event such as overlapping of processing timings between tasks and between software and hardware. Hence, with the simulation device 100, timing robust verification can be implemented with a simple configuration.

In the simulation device 100 according to this embodiment, the monitoring section performs monitoring of information such as a register, a signal, and an internal variable of software which are simulated by the target model, in addition to monitoring of an address of an instruction in execution. Also, in the simulation device 100, the monitoring target of the target model can be managed with using monitoring target information in the storage section. Therefore, with the simulation device 100, the monitoring target can be flexibly set according to a request for the simulation.

In this embodiment, the individual sections of the simulation device are described as independent function blocks. However, the configuration of the simulation device may not be a configuration as in the embodiment described above. The function blocks of the simulation device may form any configuration as far as the functions described in the above embodiment can be implemented.

Out of this embodiment, a plurality of portions may be practiced by combination. Alternatively, out of this embodiment, one portion may be practiced. Furthermore, this embodiment may be practiced entirely or partly by any combination.

The embodiment described above is an essentially preferable exemplification and is not intended to restrict the scope of the present invention, the scope of an application product of the present invention, and the scope of usage of the present invention. Various changes can be made to the embodiment described above as required.

REFERENCE SIGNS LIST

100: simulation device; 110: CPU model; 111: instruction fetch section; 112: instruction execution section; 113: calculation section; 114: determination section; 115: change section; 116: simulation execution section; 120: monitoring section; 130: HW model; 131: memory model; 132: external 10 model; 133: peripheral device model; 134: CPU bus model; 140: storage section; 210: target program; 220: instruction memory; 221: instruction code; 230: change setting information; 231: processing unit name; 232: start address; 233: end address; 234: size; 235: change rule; 240: entire time point; 250: monitoring target information; 251: monitoring target model; 252: status information; 253: expectation value; 909: electronic circuit; 910: processor; 921: memory; 922: auxiliary storage device; 930: input interface; 940: output interface; S100: simulation process.

The invention claimed is:

1. A simulation device which performs a simulation of executing a target program in a target model built in a virtual environment, the target program including a processing unit consisting of a plurality of instruction codes, the simulation device comprising:
processing circuitry
to calculate an execution processing time required for executing each instruction code of the plurality of instruction codes,
to change the execution processing time into a changed processing time according to the change rule being set in the change setting information, and to include the changed processing time of each instruction code of the plurality of instruction codes, in an entire time point indicating time point setting of the simulation,
to execute the simulation of the target program using the entire time point, and
to monitor a status of the target model during execution of the simulation; and
a memory to store change setting information in which the processing unit and a change rule that changes execution processing times of the plurality of instruction codes included in the processing unit are set.

2. The simulation device according to claim 1, wherein the target program includes a plurality of processing units,
wherein, among the plurality of processing units, a processing unit whose execution processing time is to be changed is set in the change setting information,
wherein the processing circuitry
fetches an instruction code from the memory storing the plurality of instruction codes constituting each of the plurality of processing units, and
determines whether the fetched instruction code is included in the processing unit which is set in the change setting information, and
wherein when the fetched instruction code is included in the processing unit which is set in the change setting information, the processing circuitry changes the execution processing time according to the change rule being set in the change setting information.

3. The simulation device according to claim 2, wherein the change setting information includes a name of the processing unit, a start address of the processing unit in the memory, and an end address of the processing unit in the memory, and
wherein when an address of the fetched instruction code in the memory is contained between the start address and the end address, the processing circuitry determines that the instruction code is included in the processing unit which is set in the change setting information.

4. The simulation device according to claim 2, wherein the change setting information is set with a name of the processing unit and a range of a change time point, and
wherein when a time point to execute the fetched instruction code is included in the range of the change time point, the processing circuitry determines that the instruction code is included in the processing unit which is set in the change setting information.

5. The simulation device according to claim 1, wherein the change setting information specifies the change rule by a positive/negative multiplier factor or a positive/negative fixed value.

6. The simulation device according to claim 1, wherein the memory stores monitoring target information in which a monitoring target model being a monitoring target in the target model, status information indicating a status of the monitoring target model, and an expectation value of the status information are set, and
wherein the processing circuitry monitors a time point change situation of the status information of the monitoring target model based on the monitoring target information, and outputs a monitoring result.

7. The simulation device according to claim 6, wherein, as the status information of the monitoring target model, an internal variable name of software, a register name, a signal name, or an address is set in the monitoring target information.

8. A simulation method of a simulation device which performs a simulation of executing a target program in a target model built in a virtual environment, the target program including a processing unit consisting of a plurality of instruction codes, the simulation device comprising a memory to store change setting information in which the processing unit and a change rule that changes execution processing times of the plurality of instruction codes included in the processing unit are set,
the simulation method comprising:
calculating an execution processing time required for executing each instruction code of the plurality of instruction codes;
changing the execution processing time into a changed processing time according to the change rule being set in the change setting information, and including the changed processing time of each instruction code of the plurality of instruction codes, in an entire time point indicating time point setting of the simulation;

executing the simulation of the target program using the entire time point; and monitoring a status of the target model during execution of the simulation.

9. A non-transitory computer readable medium storing a simulation program of a simulation device which performs a simulation of executing a target program in a target model built in a virtual environment, the target program including a processing unit consisting of a plurality of instruction codes, the simulation device comprising a memory to store change setting information in which the processing unit and a change rule that changes execution processing times of the plurality of instruction codes included in the processing unit are set, the simulation program causing the simulation device, being a computer, to execute:

a calculation process of calculating an execution processing time required for executing each instruction code of the plurality of instruction codes;

a changing process of changing the execution processing time into a changed processing time according to the change rule being set in the change setting information, and including the changed processing time of each instruction code of the plurality of instruction codes, in an entire time point indicating time point setting of the simulation;

a simulation executing process of executing the simulation of the target program using the entire time point; and a monitoring process of monitoring a status of the target model during execution of the simulation.

* * * * *